United States Patent
Kolinski et al.

[19]

[11] Patent Number: 6,092,207
[45] Date of Patent: Jul. 18, 2000

[54] COMPUTER HAVING A DUAL MODE POWER SUPPLY FOR IMPLEMENTING A POWER SAVING MODE

[75] Inventors: Jerzy Kolinski, Portland, Oreg.; Albert Rudy Nelson, Olympia, Wash.; Gary Solomon, Hillsboro, Oreg.

[73] Assignee: Intel Corporation, Santa Clara, Calif.

[21] Appl. No.: 08/999,492

[22] Filed: Dec. 29, 1997

[51] Int. Cl.[7] ........................................ G06F 1/32
[52] U.S. Cl. ............................... 713/323; 714/15
[58] Field of Search .................... 713/300, 320, 713/322, 323; 714/14, 15, 24

[56] References Cited

U.S. PATENT DOCUMENTS

| | | | |
|---|---|---|---|
| 3,766,403 | 10/1973 | Tsutsumi | 307/66 |
| 4,315,162 | 2/1982 | Ferguson | 307/66 |
| 4,860,185 | 8/1989 | Brewer et al. | 363/41 |
| 4,907,150 | 3/1990 | Arroyo et al. | 713/323 |
| 5,032,971 | 7/1991 | Yamada | 363/65 |
| 5,167,024 | 11/1992 | Smith et al. | 395/375 |
| 5,276,890 | 1/1994 | Arai | 713/323 |
| 5,383,140 | 1/1995 | Namo et al. | 364/708.1 |
| 5,530,879 | 6/1996 | Crump et al. | 395/750 |
| 5,548,763 | 8/1996 | Combs et al. | 395/750 |
| 5,578,876 | 11/1996 | Crampton | 307/80 |
| 5,629,694 | 5/1997 | Simon et al. | 341/22 |
| 5,631,814 | 5/1997 | Zak | 363/37 |
| 5,638,541 | 6/1997 | Sadashivaiah | 395/750 |
| 5,652,895 | 7/1997 | Poisner | 395/750 |
| 5,691,630 | 11/1997 | Chosa | 323/267 |
| 5,751,564 | 5/1998 | Dien | 363/37 |
| 5,848,280 | 12/1998 | Hanaoka | 713/300 |
| 5,944,828 | 8/1999 | Matsuoka | 713/320 |
| 5,974,552 | 10/1999 | Lim et al. | 713/320 |

OTHER PUBLICATIONS

SMC Component Products: Personal Computer Input/Output Products.
SMC: FDC37C67x Data Sheet; 100 Pin Enhanced Super I/O Controller with Fast IR.
Intel Corporation 1997, 82371AB PCI-TO-ISA/IDE Xcelerator (PIIX4), Apr. 1997.
ACPI Rev. 1.0, Dec. 22, 1996.

*Primary Examiner*—Glenn A. Auve
*Attorney, Agent, or Firm*—Antonelli, Terry, Stout & Kraus, LLP

[57] ABSTRACT

A computer includes a dual mode power supply that includes a main voltage converter and a standby voltage converter. The main voltage converter generates a main operating voltage at a normal operating current. The standby voltage generator generates a standby voltage at a standby current. The power supply outputs a dual mode output that includes both the main voltage and the standby voltage. The standby current is less than the normal operating current. The computer includes a host processor, a memory array, and a wake-up device. A power management device is coupled to the host processor and receives at least the standby voltage. The dual mode output from the power supply is input to the wake-up device and the memory array to allow the computer to be placed in a power saving mode by terminating supply of the main voltage. While in the power saving mode and receiving only the standby voltage, the wake-up device can wake-up the computer.

17 Claims, 3 Drawing Sheets

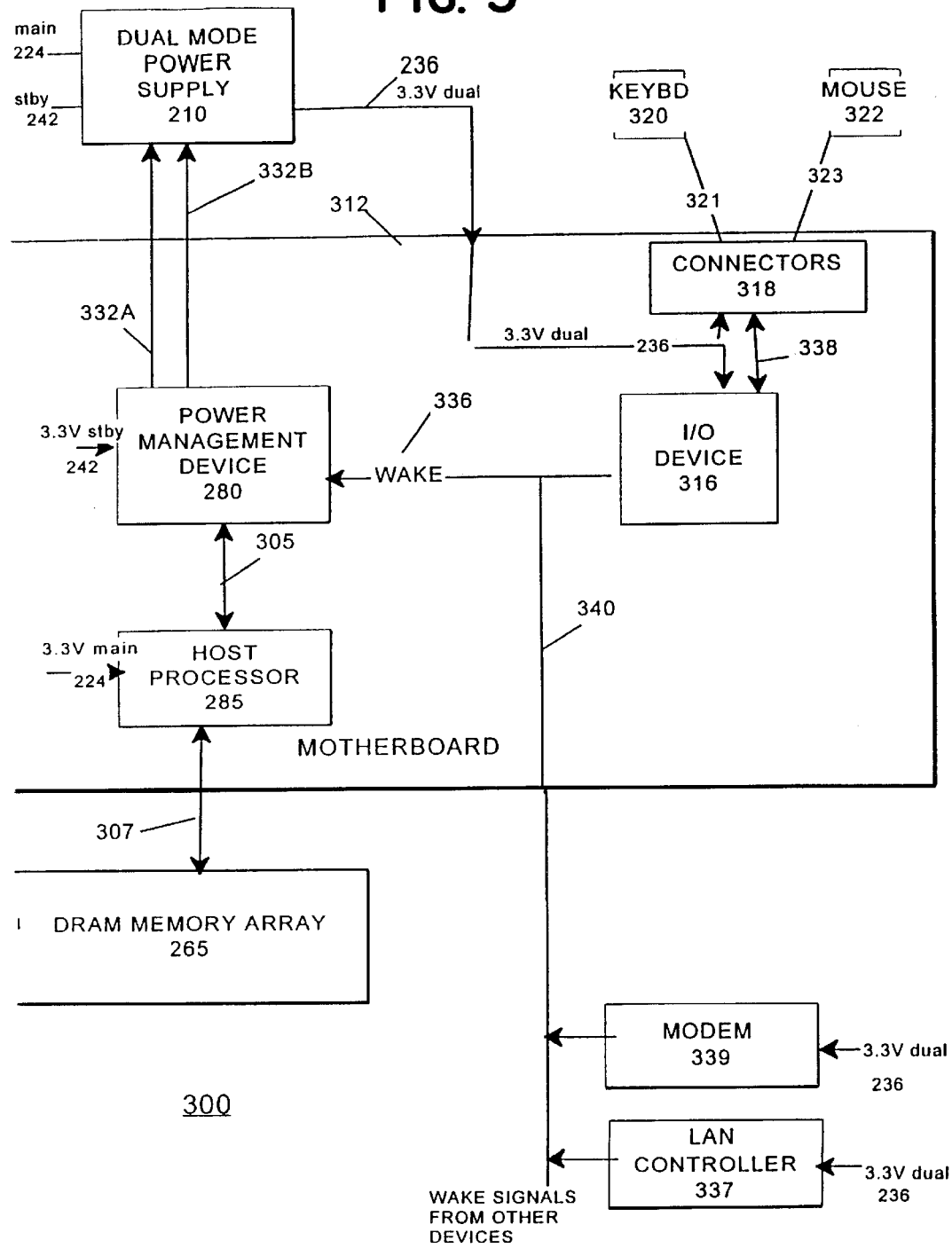

COMPUTER HAVING A DUAL MODE POWER SUPPLY FOR IMPLEMENTING A POWER SAVING MODE

TECHNICAL FIELD

The present invention relates to resume capabilities and power conservation within a digital computer, and more particularly, to a computer having a dual mode power supply for implementing a power saving mode.

BACKGROUND OF THE INVENTION

Reducing the power consumed by a computer has two significant advantages: 1) less power must be supplied to the computer; and 2) less heat must be dissipated by the computer into the surrounding environment. On a warm day, many businesses pay both for the electricity to power their computers and for the electricity for the air conditioning to cool their buildings.

Reducing power consumption in desktop personal computers (PCs) has recently become a priority. In an office environment, personal computers are often left powered up all day, and sometimes 24 hours a day. In part, this is because booting a PC can take several minutes after power is restored until the PC is usable. PCs are also left on due to user inattention to energy conservation. Nevertheless, most PCs are operating usefully only a small percentage of the business day. While one PC consumes a modest amount of power, hundreds or thousands of PCs left on during the day waste a significant amount of energy. Therefore a need exists to reduce power consumption in a PC during inactivity.

FIG. 1 illustrates a block diagram of a typical computer, such as a PC. PC 110 includes a host processor 112 connected to a local bus 114. Host processor 112 may be, for example, a Pentium® processor available from Intel Corp. for executing instructions and controlling operation of the PC. A dynamic random access memory (DRAM) card 120 and a memory controller 122 are also connected to local bus 114. A Peripheral Component Interface (PCI) bus 124 is connected to a graphics card 136, and one or more PCI expansion slots 128. A local bus/PCI bridge 126 operates as an interface or bridge for local bus signals and PCI bus signals. PC 110 also includes an Industry Standard Architecture (ISA) bus 140. The ISA bus 140 is connected to the PCI bus via a PCI/ISA bridge 132. One example of a PCI/ISA bridge 140 is the 8237AB PCI-TO-ISA/IDE Xcelerator (PIIX4), available from Intel Corp. The ISA bus is connected to one or more ISA expansion slots 138 and a Super input/output (I/O) chip 146. The Super I/O chip includes a keyboard and mouse controller, a floppy drive controller, two serial ports, a parallel port, and an infra-red (IR) port. Many PCs use a Super I/O chip 146 to interface various I/O devices in the PC, such as a keyboard and mouse, floppy drives, printers, and the like. One example of the Super I/O chip is the FDC37C67x 100 Pin Enhanced Super I/O Controller With Fast IR, available from Standard Microsystems Corp.

The PIIX4 chip, the Super I/O chip and the system software (the basic input/output system or BIOS and the operating system) can operate to place the computer into a sleep or power saving mode in which power is conserved.

In one power-saving mode for example, a command can be provided to halt the host processor 112 to conserve power. However, in these power-saving modes, the standard operating voltages (3.3V, 5.0V and at standard current) are still provided from the power supply to the motherboard and various peripheral components to allow the components to detect activity (e.g., modem or LAN activity) and then "wake" the computer to resume normal operation. As a result, a significant amount of power (typically 30 Watts) must be supplied from the power supply to the computer during these power saving modes.

When the power supply is plugged in and the external mechanical power switch is not depressed, the power supply typically provides only about 0.1 A of trickle current only to a portion of the PIIX4 chip to allow the PIIX4 chip to detect the depression of the external mechanical power switch. The PIIX4 chip and the system software operate to reestablish normal power and cold boot the computer when the PIIX4 chip detects the depression of the external power switch. However, because power is not applied to any other portion or component of the computer, it is impossible to "wake" the computer from this mechanical Off state. Therefore, a need exists for an improved technique that allows a peripheral or component to wake the computer from a power saving mode while consuming less power.

SUMMARY OF THE INVENTION

In accordance with an embodiment of the present invention, a computer includes a dual mode power supply that includes a main voltage converter generating a main operating voltage at a normal operating current, and a standby voltage converter generating a standby voltage at a standby current. The standby current is less than the normal operating current. The computer includes a host processor receiving the main operating voltage and a power management device coupled to the host processor and receiving at least the standby voltage. The computer also includes a wake-up device coupled to the power management device. The wake-up device receives as an input a dual mode output from the power supply. The dual mode output includes the main voltage and the standby voltage. The computer also includes a memory array coupled to the host processor and the dual mode output.

BRIEF DESCRIPTION OF THE DRAWINGS

FIG. 3 is a block diagram of a computer according to an embodiment of the present invention.

DETAILED DESCRIPTION

Figure 2:
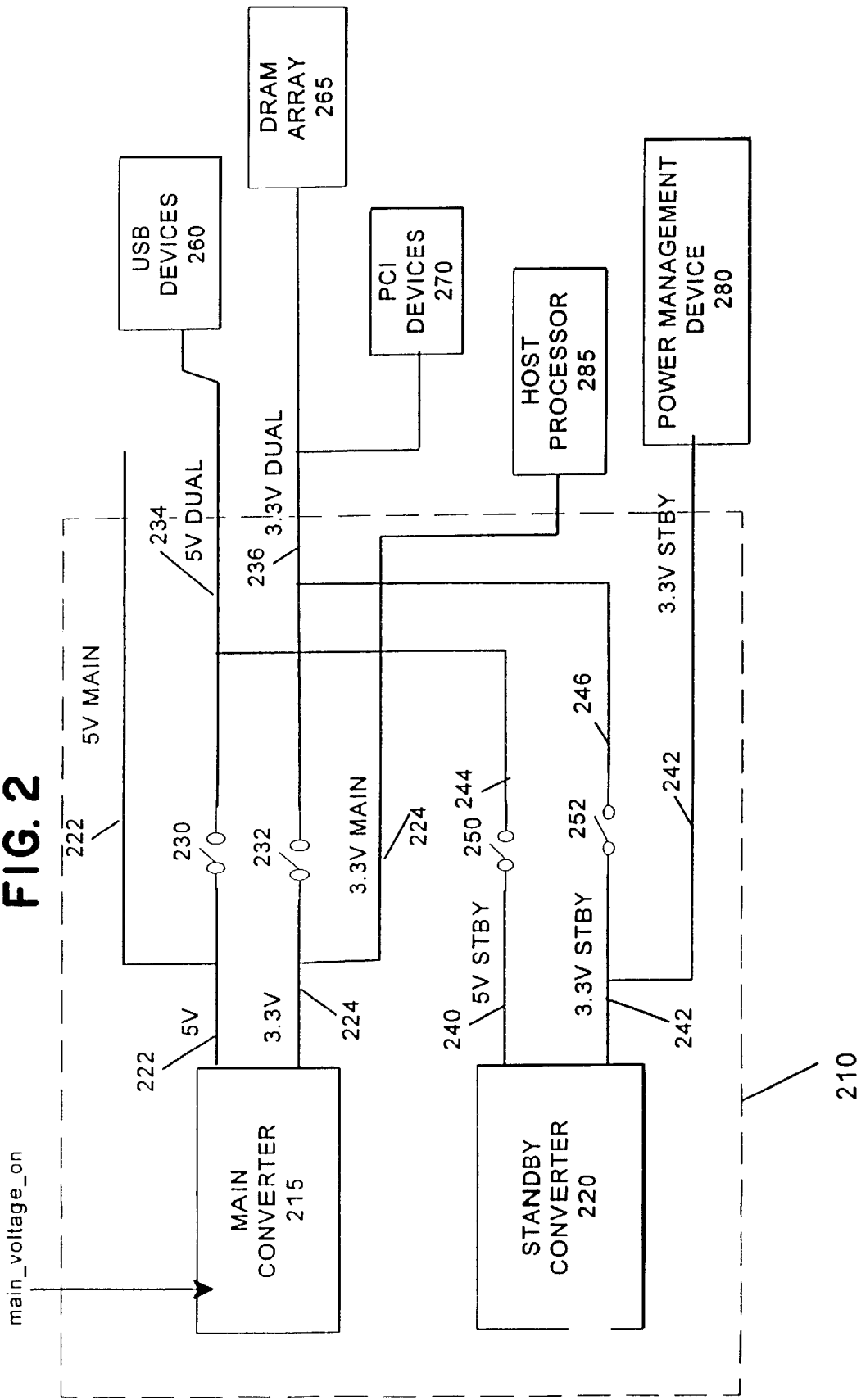
FIG. 2 is a block diagram of a portion of a dual mode power supply according to an embodiment of the present invention.

Referring to the drawings in detail, wherein like numerals indicate like elements, FIG. 2 illustrates a block diagram of a portion of a dual mode power supply 210 according to an embodiment of the present invention.

The dual mode power supply 210 includes a main voltage converter 215 and a standby voltage converter 220 for converting AC power to specific DC voltages.

Main converter 215 outputs a 3.3V main voltage 224 and a 5V main voltage 222. These main voltages are provided at a normal operating current of, for example, 15 A (maximum current). Other types of voltages can be provided (e.g., 12V, −12V). A main switch 230 is connected to the 5V main voltage 222 output from main converter 215, and a main switch 232 is connected to the 3.3V main voltage 224 output from main converter 215.

The standby converter 220 generates a 5V standby voltage 240 and a 3.3V standby voltage 242. Both standby voltages 240 and 242 are provided at a standby current that is significantly less than the normal operating current. For example, the maximum standby current may be 1–2 A. A standby switch 250 is connected to the 5V standby voltage 240. A standby switch 252 is connected to the 3.3V standby voltage 242.

The output 244 from 5V standby switch 250 is connected to the output of 5V main switch 230 to create a 5V dual mode output 234 from power supply 210. Similarly, the output 246 from 3.3V standby switch 252 is connected to the output of 3.3V main switch 232 to create a 3.3V dual mode output 236 from power supply 210. Outputs 234 and 236 are each "dual mode" because both outputs provide both the standby current and the normal current on the same output, for their respective voltages.

To connect a main voltage with a standby voltage on the same dual mode output, the main and standby voltages should be the same voltage value. While the standby and main voltages are the same voltage value (either 3.3V or 5V), the main voltage output will provide a current that is much greater than the standby voltage output. Therefore, when both the standby and main voltages are supplied on a dual mode output when the computer is in a normal operating mode, the dual mode output current will be provided from the main converter 215. Also, each separate output from power supply 210 is connected to a separate power plane on a motherboard of the computer for distributing each of the distinct voltages to the computer components.

As illustrated in FIG. 2, the outputs of power supply 210 are connected to several exemplary computer components. The 3.3V main voltage 224 is connected to a power converter of host processor 285. Host processor 285 can be, for example, a Pentium® processor available from Intel Corp. The 5V dual mode output 234 is connected to one or more Universal Serial Bus (USB) devices 260, such as a keyboard, a mouse, a monitor, etc. The 3.3V dual mode output 236 is connected to one or more Peripheral Component Interface (PCI) devices 270 and to a memory controller and a DRAM memory array 265. DRAM memory array 265 can be a Single In-Line Memory Module (SIMM) or the like. Other devices will typically be connected to power supply 210 as well. The PCI devices include a modem, a local area network (LAN) controller, a graphics card, an audio card, etc.

The 3.3V standby voltage 242 is connected to a power management device 280 for managing the different power saving modes for computer 200. The 3.3V main voltage 224 can also be connected to power management device 280. Power management device 280 can be, for example, a PIIX4 device or the like, available from Intel Corp.

When the computer is idle, power management device 280 can place the computer in a power saving mode by providing control signals to power supply 210 to open circuit switches 230 and 232 and to turn off main voltage converter 215. In this manner, power management device 280 controls power supply 210 to discontinue or cease supplying the 3.3V and 5V main voltages in order to conserve power. There are several types of power saving (or sleep) modes. Depending on the power saving mode, the processor is halted, and information describing the current state of the computer can be stored in memory or in the magnetic hard disk drive.

In addition, while the computer is in a power saving mode, power management device 280 can detect wake events (such as mouse or keyboard movement, LAN activity, modem activity, etc.), and then wake the computer by controlling power supply 210 to close switches 230 and 232 and turn on main converter 215 and output the 3.3V and 5V main voltages to all computer components. When switches 230 and 232 are closed and main converter 215 is on, the main voltages output from main converter 215 are output on dual mode outputs 234 and 236, respectively, and output on main voltage outputs 222 and 224, respectively, to provide normal operating power to all computer components. The stored information is then used to restore the computer to its previous state (the computer state before being placed in a power saving mode).

When switches 230 and 232 are open circuited, only the standby voltages are output on the dual mode outputs 234 and 236. The standby current is sufficient to allow various wake-up devices, including the USB devices 260, the PCI devices 270 and the 1394 devices to operate. The standby current is also sufficient for the power management device 280 to detect activity or a wake event and then control power supply 210 to resume supplying the main voltages (e.g., by closing switches 230, 232). When switches 230 and 232 are closed, the main voltages are output on the dual mode outputs 234 and 236. The current provided from the main voltages allows the computer to be fully operational.

The dual mode output 236 is output to DRAM memory array 265. A 3.3V voltage source at approximately 4–8 A is required to maintain the contents of the DRAM memory array 265 while in the normal operating mode. This current is supplied to the DRAM memory array 265 on the dual mode output 236 from main converter 215.

When the computer is placed in a suspend-to-RAM mode, the state of the computer is stored in RAM (DRAM memory array 265), including the operating system, application software and data, graphics information, etc., and the power supply 210 ceases supplying the main operating voltages (e.g., switches 230 and 232 are open circuited and converter 215 is turned off). While the computer is in the suspend-to-RAM mode, the DRAM is placed in the self-refresh mode where a current of approximately 0.2 A is required to maintain the contents of the DRAM memory. During the suspend-to-RAM mode, the 3.3V standby voltage and current is provided to DRAM memory array 265 from standby converter 220 via the dual mode output 236. This standby current is sufficient to maintain the contents of the DRAM memory array 265 during the suspend-to-RAM mode.

Other types of power saving modes can be used, such as a suspend-to-disk mode, wherein the state of the computer is stored in the computer's magnetic hard disk drive, including the operating system, application software and data, graphics information, etc.

The standby converter 220 is always on, and the 3.3V voltage 242 is always provided from power supply 210. As a result, power management device 280 always receives sufficient power from the 3.3V standby voltage 242 to detect wake events and to control the power supply switches to resume providing the main voltages.

FIG. 3 is a block diagram of a computer 300 according to an embodiment of the present invention. Computer 300 includes a motherboard 312, a dual mode power supply 210, the DRAM memory array 265, and several peripheral devices. The host processor 285 resides on the motherboard 312 for decoding and executing software and controlling the operation of the computer 300. The DRAM memory array 265 is coupled to the motherboard 312 via line 307 and receives the 3.3V dual mode output 236 from power supply 210. Dual mode power supply 210 is coupled to motherboard 312 via control lines 332A–B and the 3.3V dual mode output 236. Other voltage ouputs from power supply 210 illustrated in FIG. 2 are also input to motherboard 312.

Computer 300 also includes a keyboard 320 and a mouse 322. The keyboard 320 and mouse 322 are connected to keyboard and mouse connectors 318 on motherboard 312 via cables 321 and 323, respectively. Computer 300 includes additional peripheral devices, such as a local area network (LAN) controller 337, a modem 339 and a monitor or display (not shown). These peripheral devices also receive the 3.3V dual mode output 236 to allow these devices to operate when the computer is placed in a power saving mode.

Power management device 280 is coupled to host processor 285 via line 305 for managing the different power saving modes for computer 300.

Figure 1:
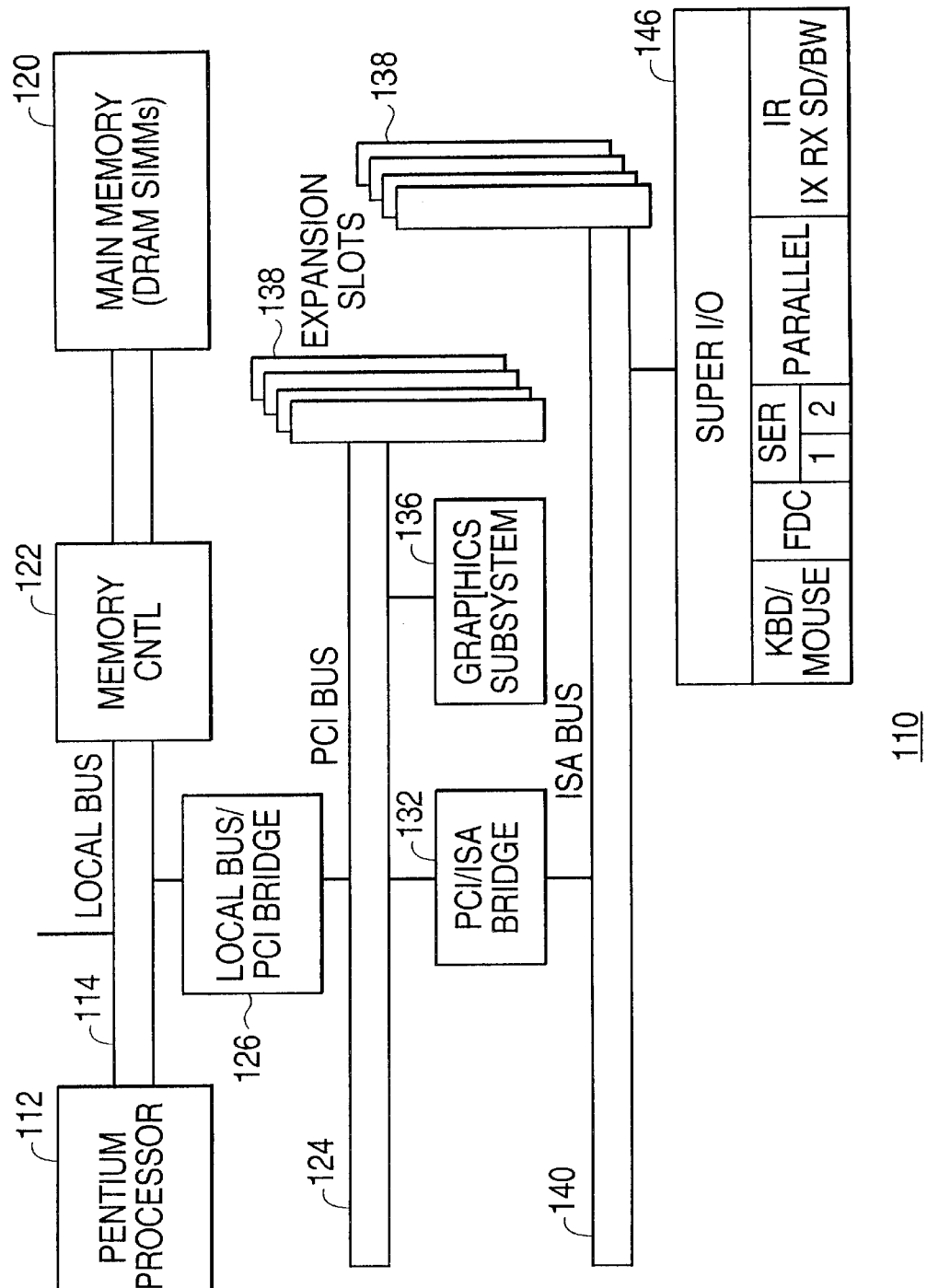
FIG. 1 is a block diagram of a computer.

An input/output (I/O) device 316 is coupled to connectors 318 via interface lines 338 and to power management device 280 via wake control line 336. I/O device 316 interfaces various I/O devices (such as keyboard 320, mouse 322 and other devices) to host processor 285. Interface lines 338 include serial data lines and clock lines for both keyboard 320 and mouse 322. The I/O device 316 includes a keyboard and mouse controller, and an infra-red interface. I/O device 316 can be a Super I/O chip, available from Standard Microsystems Corp., or a similar I/O device. Computer 300 may include additional conventional devices, as shown, for example, in FIG. 1.

The operation of the computer of FIG. 3 will now be briefly described. System power management according to the present invention operates under hardware and system software control. The system software includes a Basic Input/Output System (BIOS) and an operating system (OS) that include power management features. The system software can be used to set up a desired power saving mode. The hardware monitors the system for events which may require changing the system power mode. When one of these events is detected, the power management device 280 (e.g., a PIIX4 chip) informs the system software of the event, and the system software makes the decision to change power modes. The power management device 280 then provides the proper power control signals via lines 332A–B to power supply 210 to instruct power supply 210 to provide only the required voltages during the selected power saving mode. Power supply 210 can provide the required voltages, for example, by opening or closing one or more switches (see FIG. 2) in response to the control signals received over lines 332A–B.

After the computer 300 is placed in the power saving mode, such as the suspend-to-RAM mode, the power supply 210 ceases supplying the main voltages. The 3.3V standby voltage 242 is always input to the power management device 280 to allow power management device 280 to detect a wake signal over wake control line 336 during a power saving mode. The wake control signal can be generated by LAN controller 337, modem 339, or other devices. If I/O device 316 detects computer activity during a power saving mode from keyboard 320, mouse 322, etc., I/O device 316 outputs the wake signal to power management device 280 via line 336.

After receiving a wake signal over line 336, power management device 280 then outputs the appropriate power control signals over lines 332A–B to power supply 210 to cause the main voltages to be supplied. The main voltages are then supplied from power supply 210 and computer 300 is awakened, for example, by using stored information to restore the state of the computer to its previous state.

In one embodiment, the power control signals provided over lines 332A–B can be used to indicate which voltages should be supplied to the computer.

For example, line 332A can be used as a main_voltage_on signal to indicate to power supply 210 that the main voltages should be supplied to the computer. Line 332A is asserted to cause main switches 230 and 232 of power supply 210 (FIG. 2) to be placed in the closed position and to turn on Main converter 215.

Line 332B can be used as a standby_voltage_on signal to indicate that the standby voltages should be supplied. Line 332B is asserted to cause standby switches 250 and 252 (FIG. 2) to be placed in the closed position.

If a PIIX4 device is used as the power management device 280, the main_voltage_on signal and the standby_voltage_on signal can be implemented, for example, as the SUSB# (suspend plane B control) signal and the SUSC# (suspend plane C control) signal, respectively, output from the PIIX4 device to control power supply 210 to selectively apply the different voltages to different power planes.

Once the computer 300 has entered a specific power saving mode by storing information describing the previous state of the computer and ceasing to supply the main voltages, I/O device 316 will detect any computer activity, such as mouse movement, keyboard actuation, LAN activity. In response to detecting the computer activity, the I/O device 316 outputs a wake signal over line 336 to power management device 280. If the PIIX4 device is used as the power management device 280, the wake signal can be received by the PIIX4 (device 280) as a system management interrupt (SMI#) signal or a system control interrupt (SCI) signal.

In response to receiving the wake signal over line 336, the system software selects a power saving mode and the power management device 280 outputs the appropriate power control signals over lines 332 to power supply 210. If either the suspend-to-disk mode or the suspend-to-RAM mode is selected, the main_voltage_on signal should be unasserted to indicate that the main voltages should not be supplied.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A computer comprising:
    a dual mode power supply including:
        a) a main voltage converter generating a main operating voltage at a normal operating current;
    a power management device coupled to the host processor and coupled to the output of the standby voltage converter, the power management device closing the main switch when the computer is in a normal operating mode and open circuiting the main switch when the computer is in a power saving mode;
    a wake-up device coupled to the power management device and the dual mode power output from the power supply; and
    a memory array coupled to the host processor and connected to the dual mode output from the power supply, the memory array to store information including one or more of 1) an operating system, 2) application software and data and 3) graphics information.

2. The computer of claim 1 and further comprising a main switch connected to the output of the main voltage converter, said main switch being controlled by said power management device.

3. The computer of claim 1 and further comprising a standby switch connected to the output of the standby voltage converter, said standby switch being controlled by system software.

4. The computer of claim 1 wherein said power management device comprises a PIIX device.

5. The computer of claim 1 wherein the wake-up device comprises:
   an input/output device connected to the power management device; and
   one or more of the following devices coupled to the input/output device:
   a) a keyboard; and
   b) a mouse or other pointing device.

6. The computer of claim 5 wherein said input/output device comprises a Super I/O chip.

7. The computer of claim 1 wherein the wake-up device comprises one or more of the following:
   a network controller; and
   a modem.

8. A computer comprising:
   a dual mode power supply including:
   a) a main voltage converter generating a main operating voltage at a normal operating current;
   b) a main switch coupled to an output of the main voltage converter, an output of the main switch outputting the main operating voltage only when the main switch is in a closed position;
   c) a standby voltage converter generating a standby voltage at a standby current, the standby current being less than the normal operating current;
   d) a dual mode power output from the power supply that includes both an output of the standby voltage converter and an output of the main switch;
   a host processor connected to the output of the main switch;
   a power management device coupled to the host processor and coupled to the output of the standby voltage converter, the power management device closing the main switch when the computer is in a normal operating mode and open circuiting the main switch when the computer is in a power saving mode;
   a wake-up device coupled to the power management device and the dual mode power output from the power supply; and
   a memory array coupled the host processor and connected to the dual mode output from the power supply, the memory array to store information including one or more of 1) an operating system, 2) application software and data and 3) graphics information.

9. The computer of claim 8 wherein said dual mode power supply further comprises:
   e) a standby switch connected to an output of the standby voltage converter, an output of the standby switch outputting the standby voltage when the second switch is in a closed position.

10. The computer of claim 9 wherein the position of the standby switch is programmable under system control.

11. The computer of claim 10 wherein a user can set the position of the standby switch using system software.

12. A computer comprising:
   a dual mode power supply including a main voltage converter outputting a main voltage at a normal current and a standby voltage converter outputting a standby voltage at a standby current, the power supply including a dual mode output that includes both the main voltage and the standby voltage, the standby current being less than the normal current;
   a host processor connected to the main voltage output from the power supply;
   a wake-up device connected to the dual mode output of the power supply;
   a power management device coupled to the wake-up device, the host processor and the standby voltage output from the power supply;
   a memory array coupled to the host processor and connected to the dual mode output from the power supply; and
   the computer being programmed to perform the following steps:
      saving information in the memory array describing the current state of the computer including one or more of 1) an operating system, 2) application software and data and 3) graphics information;
      place the computer in a power saving mode by controlling the power supply to cease supplying the main voltage;
      detecting a wake-up event;
      controlling the power supply to supply the main voltage in response to detecting the wake-up event; and
      restoring the state of the computer based on the information stored in the memory array.

13. The computer of claim 12 wherein said dual mode power supply further includes:
   a main switch connected to an output of the main voltage converter; and
   a standby switch connected to an output of the standby voltage converter.

14. The computer of claim 12 wherein said wake-up device comprises one or more of the following:
   a keyboard;
   a mouse or other pointing device;
   a modem; and
   a network controller.

15. The computer of claim 12 wherein said power management device comprises a PIIX device.

16. The computer of claim 12 wherein said step of detecting comprises detecting activity from the wake-up device.

17. A method of power management in a computer comprising the steps of:
   placing the computer in a power saving mode by:
      a) storing information in a computer memory describing the current state of the computer including one or more of 1) an operating system, 2) application software and data and 3) graphics information;
      b) controlling the power supply to cease supplying a main voltage and to supply a standby voltage;
      c) supplying at least the standby voltage to a power management device;
      d) supplying a dual mode output from the power supply to the computer memory and to a peripheral device that can be used to wake the computer, the dual mode output including both the main voltage and the standby voltage;
   detecting a wake event from the peripheral device; and
   waking the computer in response to detecting the wake event by:
      a) controlling the power supply to supply the main voltage to the computer; and
      b) restoring the current state of the computer using the stored information.

* * * * *